US008585525B2

(12) United States Patent
Ushiroda et al.

(10) Patent No.: US 8,585,525 B2
(45) Date of Patent: Nov. 19, 2013

(54) LEFT AND RIGHT WHEELS DRIVE SYSTEM

(75) Inventors: Yuichi Ushiroda, Okazaki (JP); Kaoru Sawase, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/106,399

(22) Filed: May 12, 2011

(65) Prior Publication Data

US 2011/0281684 A1 Nov. 17, 2011

(30) Foreign Application Priority Data

May 13, 2010 (JP) .............................. P2010-111261

(51) Int. Cl.
*F16H 37/06* (2006.01)

(52) U.S. Cl.
USPC ............... 475/151; 475/5; 475/149; 475/150; 475/220; 475/223; 180/65.6

(58) Field of Classification Search
USPC ............. 180/65.6; 475/5, 149, 150, 151, 220, 475/223
See application file for complete search history.

(56) References Cited

U.S. PATENT DOCUMENTS

| 5,419,406 | A | | 5/1995 | Kawamoto et al. |
|---|---|---|---|---|
| 5,443,130 | A | * | 8/1995 | Tanaka et al. ................. 180/65.6 |
| 7,507,178 | B2 | * | 3/2009 | Rosemeier et al. ........... 475/205 |
| 7,867,125 | B2 | * | 1/2011 | Kim et al. ...................... 475/150 |
| 8,177,007 | B2 | * | 5/2012 | Abe et al. .................. 180/65.285 |
| 2005/0124451 | A1 | | 6/2005 | Morikawa |
| 2006/0247081 | A1 | * | 11/2006 | Yamauchi et al. ................. 475/1 |
| 2007/0021262 | A1 | | 1/2007 | Honda et al. |
| 2009/0038866 | A1 | | 2/2009 | Abe et al. |
| 2009/0250280 | A1 | * | 10/2009 | Abe et al. .................. 180/65.285 |
| 2009/0318255 | A1 | * | 12/2009 | Kato .............................. 475/149 |
| 2010/0041502 | A1 | * | 2/2010 | Nagamatsu ....................... 475/5 |

FOREIGN PATENT DOCUMENTS

| JP | 5-116542 A | 5/1993 |
|---|---|---|
| JP | 8-19110 A | 1/1996 |
| JP | 9-310749 A | 2/1997 |
| JP | 2005-138824 A | 6/2005 |
| JP | 2006-117011 A | 5/2006 |

(Continued)

OTHER PUBLICATIONS

European Search Report issued on Mar. 12, 2012.

(Continued)

*Primary Examiner* — Derek D Knight
(74) *Attorney, Agent, or Firm* — Birch, Stewart, Kolasch & Birch, LLP (57) ABSTRACT

A left and right wheels drive system includes: first and second drive sources left and right drive wheels; and a gear mechanism interposed between the drive sources and the drive wheels, the gear mechanism including: a pinion set including a plurality of pinion gears installed on one shaft; and an element group linked with the pinion set and includes first, second, third, and fourth elements When the first element is held stationary, the second, third and fourth elements rotate in the same direction. When the first element is held stationary, the second element rotates at a higher speed than the third and fourth elements. One of the first and second drive sources is connected to the first element, and the other is connected to the second element. One of the left and right drive wheels is connected to the third element, and the other is connected to the fourth element.

6 Claims, 9 Drawing Sheets (56) References Cited

FOREIGN PATENT DOCUMENTS

| | | |
|---|---|---|
| JP | 2007-177916 A | 7/2007 |
| JP | 2008-215519 A | 9/2008 |
| JP | 2008-256000 A | 10/2008 |

OTHER PUBLICATIONS

European Search Report issued in European Patent Application No. 11165871.2 on Nov. 29, 2012.
Japanese Office Action issued in Japanese Patent Application No. 2010-111261 on Apr. 1, 2013.

* cited by examiner

FIG. 2A

⇩ ANY FOUR ELEMENTS

FIG. 2B

WL : LEFT WHEEL
WR : RIGHT WHEEL
M1, M2 : MOTOR

FIG. 3C $TL = (b1+1) \cdot TM1 - b2 \cdot TM2$
$TR = (b2+1) \cdot TM2 - b1 \cdot TM1$ $T = TM2 + TM1$
$\Delta T = (2 \cdot b2 + 1) \cdot TM2 - (2 \cdot b1 + 1) \cdot TM1$

FIG. 9

LEFT AND RIGHT WHEELS DRIVE SYSTEM

BACKGROUND OF THE INVENTION

1. Field of the Invention

The present invention relates to a left and right wheels drive system which can transmit drive torque from two drive sources to left and right drive wheels while a drive torque difference is introduced therebetween, and more particularly to a left and right wheels drive system which is suitable for use in an electric vehicle which employs an electric motor as a drive source.

2. Description of the Related Art

In electric vehicles (also, referred to simply as vehicles), there is a related-art technique in which electric motors (motors) are provided for left and right drive wheels, respectively, and a drive torque difference is introduced between the left and right drive wheels as required by controlling the electric motors independently, whereby the turning moment of the vehicle is controlled (for example, refer to JP-A-8-19110 and JP-A-2005-138824).

However, in a running scene in which the vehicle requires a large total drive torque (a total of the drive torque of the left and right drive wheels) as when the vehicle is accelerated, the drive torque of each of the left and right drive wheels has to be increased, and therefore, it is difficult to apply a large drive torque difference between the left and right drive wheels. Namely, in order to apply the large drive torque difference between the left and right drive wheels, the drive torque of either of the motors has to be decreased. However, when this occurs, the total drive torque of the vehicle is decreased accordingly, and the running performance of the vehicle in acceleration, for example, becomes insufficient.

To improve this problem, as is described in JP-A-2006-117011, a related-art technique is considered in which the turning moment of a vehicle is controlled without decreasing the drive torque of both of left and right drive wheels by providing a steering unit for turning the drive wheels by making use of a torque reaction force of motors. However, this related-art technique calls for complexity and an increase in weight of the system concerned.

On the other hand, JP-A-2008-215519 discloses a related-art technique in which a torque shift can be made between two motors by interposing two differentials each employing a planetary gear mechanism and two reduction gear trains each made up of a combination of gears between output shafts of the two motors. As in this related-art technique, in the event that the torque shift can be made between two motors, a large drive torque difference can be introduced between left and right drive wheels while suppressing the reduction in total drive torque.

As has been described above, according to the related-art technique disclosed in JP-A-8-19110, the large drive torque difference can be introduced between the left and right drive wheels while suppressing the reduction in total drive torque by making use of the torque shift between the two motors. However, it has been desired that a system configuration is developed which can produce a desired drive torque difference between left and right drive wheels while suppressing a reduction in total drive torque with a simpler configuration.

SUMMARY OF THE INVENTION

It is therefore an object of the invention to provide a left and right wheels drive system which can apply a required drive torque difference between left and right drive wheels while suppressing a reduction in total drive torque with a simple configuration.

In order to achieve the object, according to the invention, there is provided a left and right wheels drive system comprising: a first drive source and a second drive source; a left drive wheel and a right drive wheel; and a gear mechanism interposed between the first and second drive sources and the left and right drive wheels, the gear mechanism including: a pinion set in which a plurality of pinion gears are installed on one shaft; and an element group which is linked with the pinion set and which includes a first element, a second element, a third element and a fourth element, wherein when the first element is held stationary, the second, third and fourth elements rotate in the same direction, when the first element is held stationary, the second element rotates at a higher speed than the third and fourth elements, one of the first and second drive sources is connected to the first element, the other of the first and second drive source is connected to the second element, one of the left and right drive wheels is connected to the third element, and the other of the left and right drive wheels is connected to the fourth element.

The pinion set may be a twin pinion including: a first pinion gear; and a second pinion gear of which a reference pitch diameter is larger than that of the first pinion gear. The element group may include: a first sun gear which is adapted to mesh with the first pinion gear; a second sun gear which is adapted to mesh with the second pinion gear; a carrier which pivotally supports the twin pinion; and a ring gear which is adapted to mesh with one of the first and second pinion gears. The first element may be the ring gear, the second element may be the second sun gear, the third element may be the carrier, and the fourth element may be the first sun gear.

The pinion set may be a triple pinion including: a first pinion gear; a second pinion gear of which a reference pitch diameter is larger than that of the first pinion gear; and a third pinion gear of which a reference pitch diameter is larger than that of the second pinion gear. The element group may include: a first sun gear which is adapted to mesh with the first pinion gear; a second sun gear which is adapted to mesh with the second pinion gear; a third sun gear which is adapted to mesh with the third pinion gear; and a carrier which pivotally supports the triple pinion. The first element may be the carrier, the second element may be the third sun gear, the third element may be the first sun gear, and the fourth element may be the second sun gear.

A specification of the first drive source may be identical to a specification of the second drive source, and maximum output of the first drive source may be identical to maximum output of the second drive source.

The first drive source may be an electric motor, and the second drive source may be an electric motor.

BRIEF DESCRIPTION OF THE DRAWINGS

FIGS. 1A, 1B and 1C show drawings depicting a principle configuration of a left and right wheel drive system of the invention, in which

FIGS. 3A, 3B and 3C show drawings depicting a left and right wheels drive system according to a first embodiment of the invention, in which

FIGS. 4A, 4B and 4C show drawings depicting a system for individually driving left and right drive wheels as a comparison example with the left and right wheels drive system according to the first embodiment of the invention, in which

DETAILED DESCRIPTION OF THE INVENTION

Hereinafter, embodiments of the invention will be described by use of the drawings.
[Configuration]
Firstly, a principle configuration of a left and right wheels drive system of the invention will be described by use of FIGS. 1A to 2B.

The left and right wheels drive system of the invention includes, for example, a first and second drive sources, left and right drive wheels and a gear mechanism which is interposed between the first and second drive sources and the left and right drive wheels, which are equipped on a motor vehicle (also, referred to simply as a vehicle).

A unique feature of this system resides in the configuration of the gear mechanism.

Figure 1A:
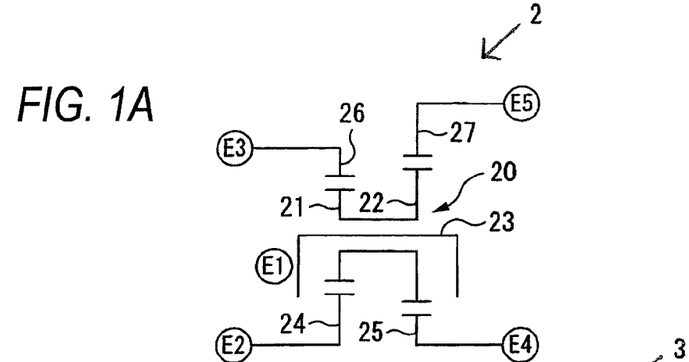
FIG. 1A is a skeleton diagram showing an example in which a twin pinion is adopted for a gear mechanism.
Figure 1B:
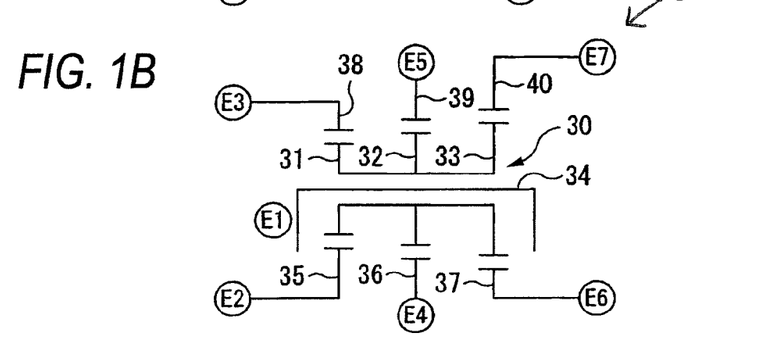
FIG. 1B is a skeleton diagram showing an example in which a triple pinion is adopted for the gear mechanism.

FIG. 1A is a skeleton diagram of a gear mechanism according to a first embodiment, which will be described later, and FIG. 1B is a skeleton diagram of a gear mechanism according to a second embodiment, which will be described later. In each diagram, only one side of the gear mechanism is shown with respect to an axis thereof.

One of features of the gear mechanism of the invention resides in a feature in which a pinion set is employed in which a plurality of pinion gears are consecutively installed on one shaft.

Namely, in the example shown in FIG. 1A, a pinion set 20 (twin pinion) of a gear mechanism 2 is configured as a twin pinion in which two pinion gears, a first pinion gear 21 and a second pinion gear 22 of which a reference pitch diameter is larger than that of the first pinion gear 21, are consecutively installed together.

Note that when paying attention to respective rotation speeds of the pinion gears, since respective peripheral velocities of the pinion gears (velocities at the reference pitch diameters of the pinion gears) are equal to each other, the description reading, "the reference pitch diameter is larger" can instead be expressed as "the rotation speed is slower." In addition, when respective modules (sizes of gear teeth) of the pinion gears are equal to each other, the description, reading "the reference pitch diameter is larger" can instead be expressed as "the number of teeth is larger."

In addition, in the example shown in FIG. 1B, a pinion set 30 (triple pinion) of a gear mechanism 3 is configured as a triple pinion in which three pinion gears, a first pinion gear 31, a second pinion gear 32 of which a reference pitch diameter is larger than that of the first pinion gear 31 and a third pinion gear 33 of which a reference pitch diameter is larger than that of the second pinion gear 32 are consecutively installed together.

In the case of the twin pinion shown in FIG. 1A, as constituent elements of the gear mechanism, the gear mechanism 2 can include, in addition to the twin pinion 20, five elements such as a carrier 23 (an element E1) which supports rotatably the twin pinion 20, a first sun gear 24 (an element E2) which meshes with the first pinion gear 21, a first ring gear 26 (an element E3) which meshes with the first pinion gear 21, a second sun gear 25 (an element E4) which meshes with the second pinion gear 22, and a second ring gear 27 (an element E5) which meshes with the second pinion gear 22. As the gear mechanism according to the embodiment, the gear mechanism 2 may only have to include any four elements in the five elements E1 to E5 as is shown in speed diagrams of FIGS. 2A and 2B.

In the case of the triple pinion shown in FIG. 1B, as constituent elements of the gear mechanism, the gear mechanism 3 can include, in addition to the triple pinion 30, seven elements such as a carrier 34 (an element E1) which supports rotatably the triple pinion 30, a first sun gear 35 (an element E2) which meshes with the first pinion gear 31, a first ring gear 38 (an element E3) which meshes with the first pinion gear 31, a second sun gear 36 (an element E4) which meshes with the second pinion gear 32, and a second ring gear 39 (an element E5) which meshes with the second pinion gear 32, a third sun gear 37 (an element E6) which meshes with the third pinion gear 33, and a third ring gear 40 (an element E7) which meshes with the third pinion gear 33. As the gear mechanism according to the embodiment, the gear mechanism 3 may only have to include any four elements in the seven elements E1 to E7 as is shown in speed diagrams of FIGS. 2A and 2B.

In addition, connections of the first and second drive sources and the left and right drive wheels to any four elements in the gear elements are prescribed as follows.
[Prescription 1]
One of the first and second drive sources is to be connected to a gear element (a first element) which is one of four elements. When the gear element (the first element) is fixed so as not to rotate or held stationary, the other three elements rotate in the same direction.

[Prescription 2]

The other of the first and second drive sources is to be connected to a gear element (a second element) which is one of the remaining three elements. When the first element is held stationary, the gear element (the second element) rotates at the highest rotation speed.

[Prescription 3]

The left drive wheel is to be connected to one of the remaining two elements (a third element and a fourth element) and the right drive wheel is to be connected to the other element.

[Prescription 1] to [Prescription 3] are conditions such that when there is introduced a difference in drive torque from the first and second drive sources, the resulting torque difference is multiplied for transmission to the left and right drive wheels.

Figure 1C:
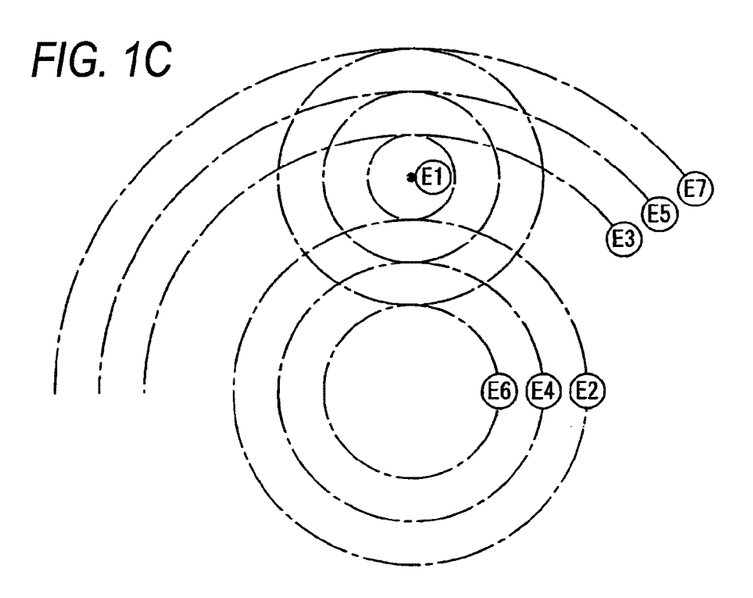
FIG. 1C is a diagram showing respective rotation orbits of elements of the gear mechanism.

FIG. 1C is a drawing showing respective rotation orbits of the elements E2 to E7 with the element E1 held stationary. Referring to FIG. 1C, when the element E1, which is the carrier, is held stationary, the pinion set 20 or 30 rotates on its own axis, and all of the elements E2, E4, E6, which are the sun gears, rotate in a reverse direction to the pinion set 20 or 30, while all of the elements E3, E5, E7, which are the ring gears, rotate in the same direction as the pinion set 20 or 30.

Consequently, in order to set the first element to the element E1 prescribed in [Prescription 1], the configuration of the twin pinion 20 shown in FIG. 1A is not suitable, and the configuration of the triple pinion 30 shown in FIG. 1B is adopted. Then, the second, third and fourth elements are set either to the elements E2, E4 and E6 or to the elements E3, E5 and E7. When the second, fourth and sixths elements are set to the elements E2, E4, E6, with the element E1 held stationary, in the elements E2, E4, E6, the element E6 rotates at a highest speed. Thus, the second element is set to the element E6, and one of the third and fourth elements is set to the element E2 and the other to the element E4.

In addition, when any of the elements E2, E4, E6, which are the sun gears, is held stationary, the element E1, which is the carrier, rotates. Then, the pinion set 20 or 30 rotates on its own axis in the same direction as the rotating direction of the element E1, and in the elements E2, E4, E6, the gear wheel whose reference pitch diameter is larger than that of the element held stationary rotates on its own axis in the same direction as the rotating direction of the element E1 at a fast speed which is proportional to the magnitude of the reference pitch diameter thereof. On the other hand, the gear wheel whose reference pitch diameter is smaller than that of the element held stationary rotates on its own axis in a reverse direction to the rotating direction of the element E1 at a fast speed which is proportional to the magnitude of the reference pitch diameter thereof. In addition, all of the elements E3, E5, E7, which are the ring gears, rotate in the same direction as the rotating direction of the element E1 at a speed faster than that of the element E1 in proportional to the magnitude of reference pitch diameters thereof.

Consequently, for example, with the configuration of the twin pinion 20 shown in FIG. 1A adopted, in order to set the first element E1 prescribed in [Prescription 1] to either of the elements E2, E4, the element E4 which has a smaller reference pitch diameter is adopted to establish the configuration in which the other three elements rotate in the same direction, and one of the first and second drive sources is connected to the element E4. In addition, in order to satisfy [Prescription 2], either of the elements E3, E5 is adopted as the second element, and the other of the first and second drive sources is connected to the element so adopted.

Figure 2A:
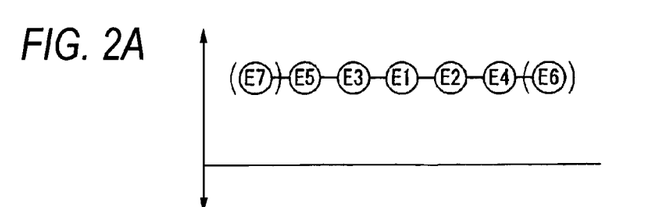
FIGS. 2A and 2B show speed diagrams depicting the principle configuration of the left and right wheels drive system of the invention to show that four elements shown in FIG. 2B are applied to elements which can be installed in a gear mechanism shown in FIG. 2A.
Figure 2B:
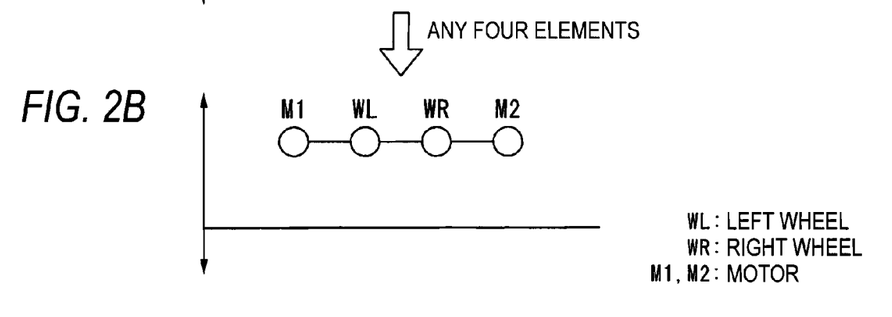

According to the configuration described above, the drive sources (for example, the electric motors) M1, M2 and the left and right drive wheels WL, WR can be arranged as is shown in a speed diagram of FIG. 2B. Then, when a drive torque difference is introduced between the drive sources M1, M2, this drive torque is multiplied for transmission to the left and right drive wheels WL, WR.

Hereinafter, first and second embodiments of the invention will be described.

First Embodiment (Configuration)

Figure 3A:
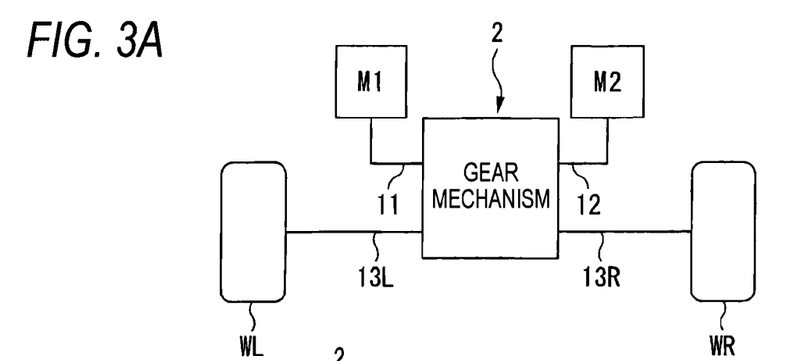
FIG. 3A is a block diagram showing a drive system thereof.

A left and right wheels drive system of a first embodiment includes, as is shown in FIG. 3A, a first electric motor (a first motor) M1 as a first drive source, a second electric motor (a second motor) M2 as a second drive source, a gear mechanism 2, a left drive wheel (also, referred to, simply, as a left wheel) WL and a right drive wheel (also, referred to, simply, as a right wheel) WR and is equipped on an electric vehicle (including not only a pure electric vehicle but also a hybrid-type electric vehicle) as part (a power plant) of a drive line. Electric motors in the same specification in terms of maximum output are used for the first motor M1 and the second motor M2.

Figure 3B:
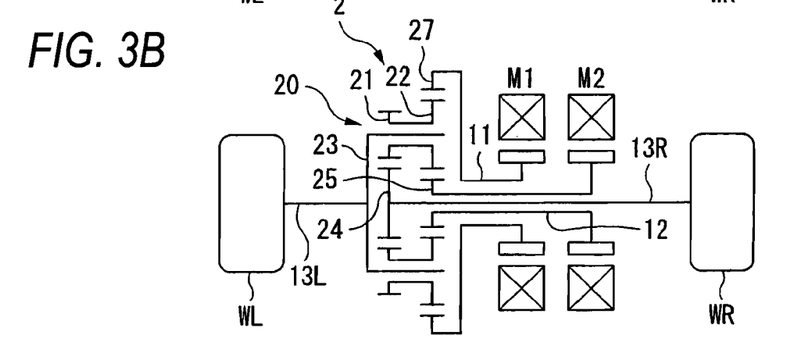
FIG. 3B is a skeleton diagram showing a gear mechanism thereof.

As is shown in FIG. 3B, the gear mechanism 2 includes, as a pinion set, a twin pinion 20 in which a first pinion gear 21 and a second pinion gear 22 of which a reference pitch diameter is larger than that of the first pinion gear 21. In addition to this twin pinion 20, the gear mechanism 2 includes four power transmission elements such as a carrier 23 which supports rotatably the twin pinion 20, a first sun gear 24 which meshes with the first pinion gear 21, a second sun gear 25 which meshes with the second pinion gear 22 and a ring gear 27 which meshes with the second pinion gear 22.

Then, the first motor M1, the second motor M2, the left wheel WL and the right wheel WR are connected to the gear mechanism 2. The first motor M1 is connected to the ring gear 27 via a hollow shaft 11, the second motor M2 to the second sun gear 25 via a hollow shaft 12, the left wheel WL to the carrier 23 via a shaft 13L, and the right wheel WR to the first sun gear 24 via a shaft 13R.

Figure 3C:
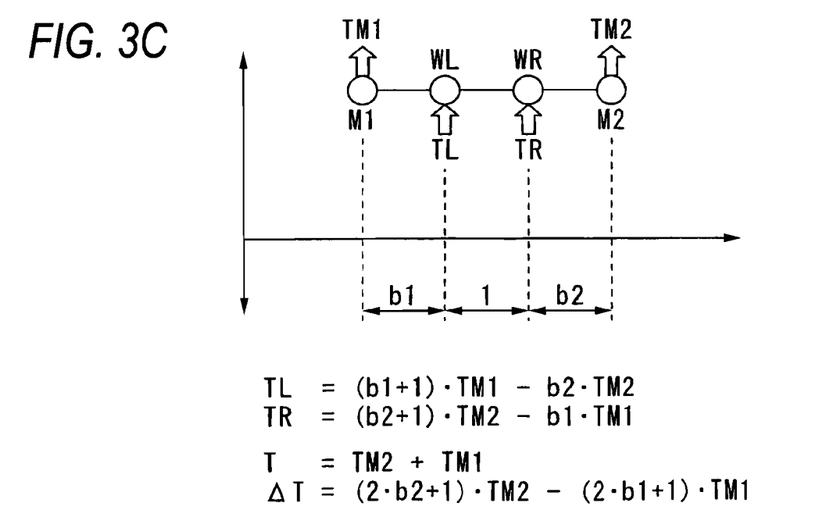
FIG. 3C is a speed diagram depicting the function of the left and right wheels drive system.

This configuration satisfies [Prescription 1] to [Prescription 3] described above, and the first motor M1, the second motor M2, the left wheel WL and the right wheel WR are put in a relationship shown in a speed diagram of FIG. 3C via the gear mechanism 2.

In FIG. 3C, TM1 denotes output torque of the first motor M1, TM2 denotes output torque of the second motor M2, TL denotes input torque (vehicle drive torque) into the left wheel WL, and TR denotes input torque (vehicle drive torque) into the right wheel WR. In addition, b1 denotes a gear ratio of the first motor M1 in the speed diagram when a gear ratio of the left and right wheels WL, WR is referred to as a reference ($=1$), and b2 denotes a gear ratio of the second motor M2 in the speed diagram when the gear ratio of the left and right wheels WL, WR is referred to the reference ($=1$). These gear ratios b1, b2 can also be obtained from the number of gear teeth of each gear.

When paying attention to torque, from the speed diagram of FIG. 3C, the input torque TL into the left wheel WL and the input torque TR into the right wheel WR can be expressed into the following expressions (1a) and (1b) by the gear ratio b1 of the first motor M1 and the gear ration b2 of the second motor M2.

$$TL=(b1+1)\cdot TM1-b2\cdot TM2 \tag{1a}$$

$$TR=(b2+1)\cdot TM2-b1\cdot TM1 \tag{1b}$$

In addition, a total torque required to drive the vehicle and a torque difference ΔT (=TR−TL) between the left and right wheels can be expressed by the following expressions (2) and (3).

$$T = TM1 + TM2 \quad (2)$$

$$\Delta T = (2 \cdot b2 + 1) \cdot TM2 - (2 \cdot b1 + 1) \cdot TM1 \quad (3)$$

Normally, the gear ratio b1 of the first motor M1 and the gear ratio b2 of the second motor are set to the same value (b1=b2=b) so as to balance the drive control of the left and right wheels WL, WR. Therefore, in this case, the expression (3) can be expressed by the following expression (3A).

$$\Delta T = (2 \cdot b + 1) \cdot TM2 - (2 \cdot b + 1) \cdot TM1 \quad (3A)$$
$$= (2 \cdot b + 1) \cdot (TM2 - TM1)$$

Consequently, in the event that the output torque TM1 of the first motor M1 and the output torque TM2 of the second motor M2 are set to the same value, the torque difference ΔT between the left and right wheels becomes 0. On the other hand, in the event that a difference (=|TM2−TM1|) is introduced between the output torque TM1 of the first motor M1 and the output torque TM2 of the second motor M2, a torque difference which is (2·b+1) times larger than the motor output torque difference is produced between the left and right wheels WL, WR.

The gear ratio b1 of the first motor M1 and the gear ratio b2 of the second motor M2 are determined by respective reference pitch diameters of the constituent gears of the gear mechanism 2, and therefore, the gear ratios b1, b2 are subjected to restrictions from the configuration of the gear mechanism 2 or the configuration of the drive line. In the case of the configuration of the left and right wheels drive system of the first embodiment, the gear ratios b1, b2 are preferably set to a range ranging substantially from 0.5 to 2.0. Of course, the gear ratios b1, b2 can also be set to a value exceeding the range. However, as this occurs, the configuration of the gear mechanism 2 becomes special with respect to the reference pitch diameters of the constituent gears or the numbers of gear teeth thereof.

For example, when both the gear ratios b1, b2 are set to 0.5, a torque difference twice the output torque difference between the motors can be produced between the left and right wheels WL, WR. In addition, when both the gear ratios b1, b2 are set to 1.0, a torque difference three times larger than the output torque difference between the motors can be produced between the left and right wheels WL, WR. Further, when both the gear ratios b1, b2 are set to 2.0, a torque difference five times larger than the output torque difference between the motors can be produced between the left and right wheels WL, WR.

(Function and Advantage)

Since the left and right wheels drive system according to this embodiment is configured as has been described heretofore, when a difference is introduced between the drive torque outputted from the first motor M1 and the drive torque outputted from the second motor M2, the drive torque difference is multiplied for transmission to the left and right wheels WL, WR.

When wanting to ensure a large total drive torque at the left and right wheels WL, WR which is required to drive the vehicle, that is, a large total torque of drive torque outputted from the first motor M1 and drive torque outputted from the second motor M2, a reduction in drive torque outputted from each of the motors M1, M2 has to be avoided as much as possible. Then, in this case, one of the first motor M1 and the second motor M2 is caused to output its maximum drive torque, while the drive torque of the other motor is reduced so as to introduce a drive torque difference between the left and right wheels WL, WR. As this occurs, in this system, since the output torque difference between the motors is multiplied to constitute a torque difference introduced between the left and right wheels WL, WR, a required drive torque difference can be introduced between the left and right wheels WL, WR, while suppressing the reduction amount of drive torque outputted from one of the motors. Namely, the turning of the vehicle can be controlled by introducing the required drive torque difference between the left and right wheels WL, WR, while suppressing the reduction in total drive torque of the vehicle.

In this embodiment, since the twin pinion 20 is adopted as the pinion set of the gear mechanism 2, the advantage described above can be obtained with the simple configuration.

In addition, since the motors in the same specification in terms of maximum output are used for the first motor M1 and the second motor M2, the torque control of the left and right wheels can implemented simply and in a balanced fashion, and moreover, this is advantageous in terms of costs to be incurred for equipment of the motors.

Here, referring to FIGS. 4A to 8, advantageous features of the left and right wheels drive system of the embodiment will be described while comparing it with a comparison example.

Figure 4A:
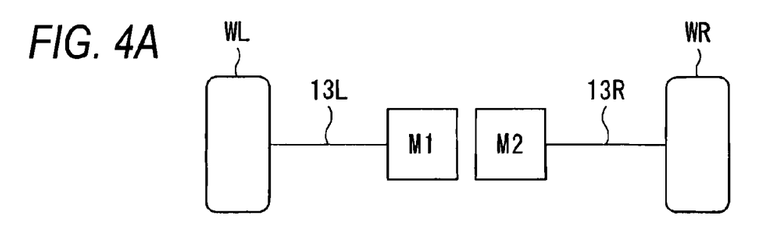
FIG. 4A is a block diagram showing a drive system thereof.
Figure 4B:
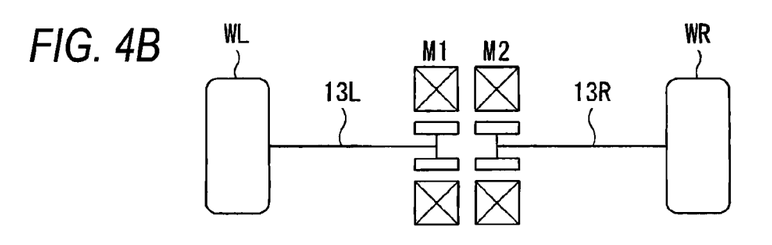
FIG. 4B is a skeleton diagram showing a gear mechanism thereof.
Figure 4C:
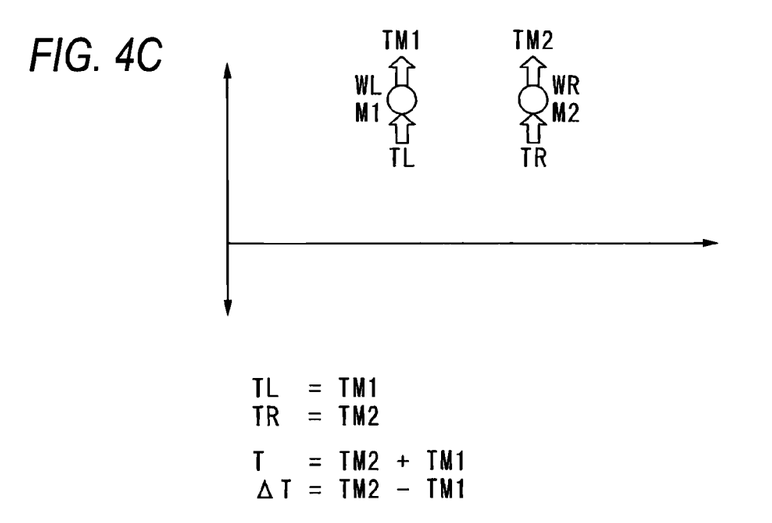
FIG. 4C is a speed diagram depicting the function of the comparison example.

Firstly, a comparison example will be described by reference to FIGS. 4A to 4C. A left and right wheels drive system of the comparison example is a related-art system (for example, refer to JP-A-8-19110 and JP-A-2005-138824) as is shown in FIG. 4A in which left and right drive wheels WL, WR are driven independently by corresponding motors M1, M2. As is shown in FIG. 4B, the motors M1, M2 are independently connected to the left and right wheels via corresponding gear mechanisms. Consequently, as is shown in FIG. 4C, output torque TM1 of the motor M1 directly constitutes drive torque at the left wheel WL, and output torque TM2 of the motor M2 directly constitutes drive torque at the right wheel WR. Because of this, to introduce a torque difference between the left and right wheels WL, WR, a output torque difference which is equal to the torque different that is wanted to be introduced needs to be introduced between the motors.

Figure 5:
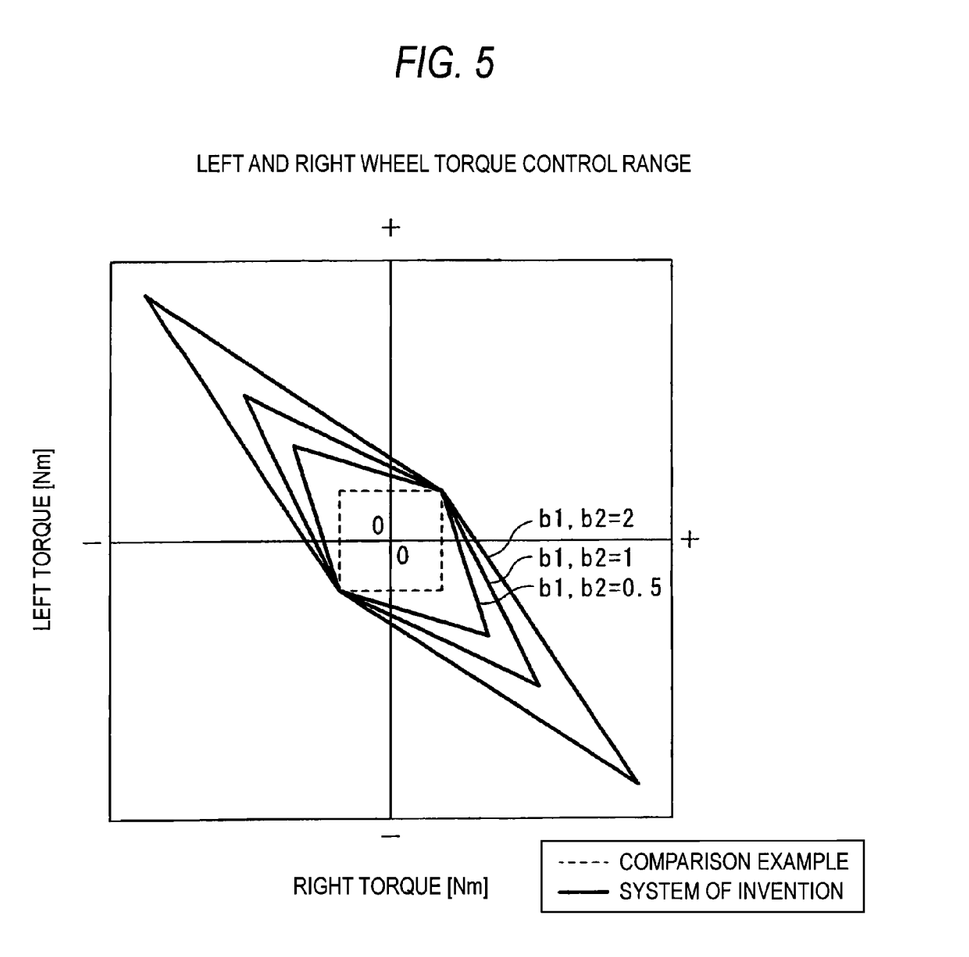
FIG. 5 is a chart showing torque control ranges of left and right drive wheels by the left and right wheels drive system according to the first embodiment of the invention together with those of the comparison example.

FIG. 5 shows torque control ranges of the left and right wheels by the left and right wheels drive system according to the first embodiment while comparing them with those of the comparison example. As to the system of this embodiment, torque control ranges are shown which will be realized when the gear ratios b1, b2 are both set to 0.5, when the gear ratios b1, b2 are both set to 1.0 and when the gear ratios b1, b2 are both set to 2.0. In any case, the torque control range of the left and right wheels by the system of this embodiment becomes wider than that of the comparison example. In particular, as the rear ratios b1, b2 are increased, the output torque difference between the motors is multiplied further to constitute a torque difference between the left and right wheels WL, WR. Thus, it is seen from this that the torque control ranges of the left and right wheels are also expanded.

Figure 6:
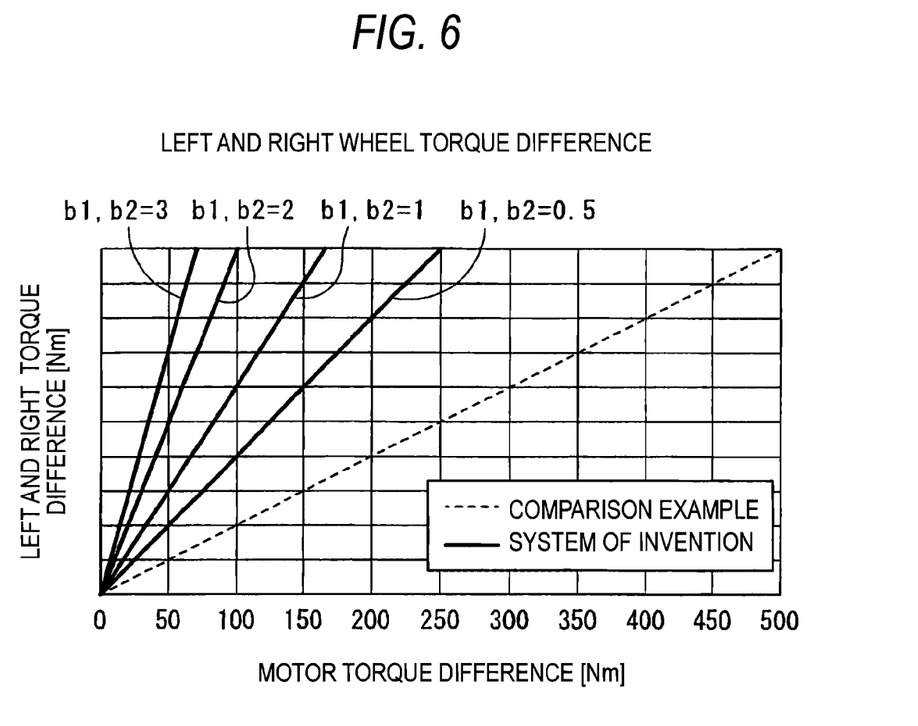
FIG. 6 is a chart showing characteristics of a torque difference between the left and right drive wheels relative to a torque difference between drive sources (electric motors) together with those of the comparison example.

FIG. 6 shows characteristics of a torque difference between the left and right wheels relative to a torque difference between the motors M1, M2 together with those of the comparison example. As to the system of this embodiment, torque difference characteristics are shown which will be realized when the gear ratios b1, b2 are both set to 0.5, when the gear ratios b1, b2 are both set to 1.0 and when the gear ratios b1, b2 are both set to 2.0. In any case, the torque difference between the left and right wheels relative to the torque difference between the motors is larger than that of the comparison example. In particular, as the rear ratios b1, b2 are increased, the torque difference between the motors is multiplied further to constitute a torque difference between the left and right wheels WL, WR. Thus, it is seen from this that the torque difference between the left and right wheels relative to the torque difference between the motors is also increased.

Figure 7:
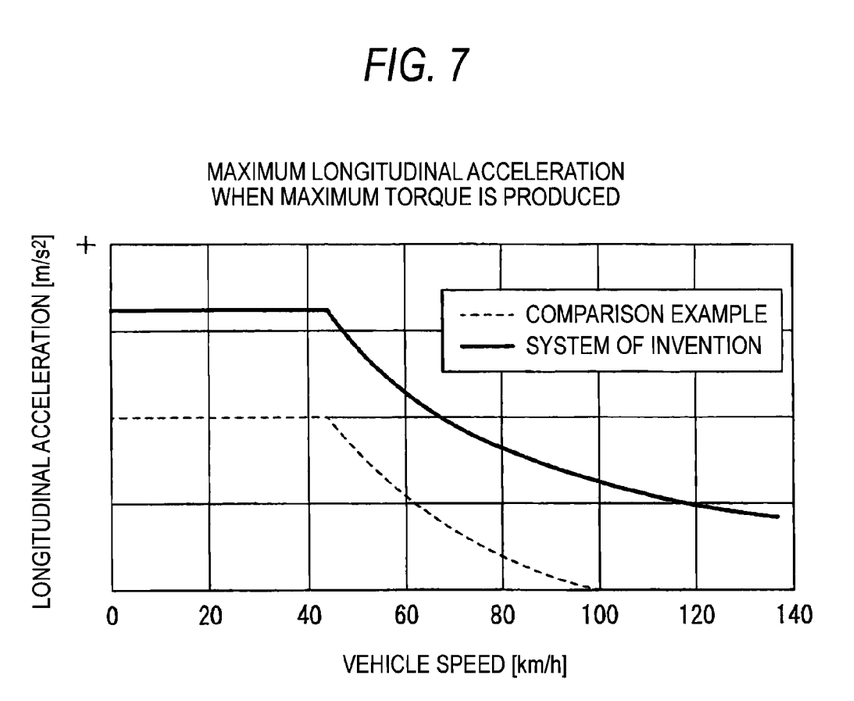
FIG. 7 is a chart showing acceleration and deceleration limits with respect to a vehicle speed that would result when a maximum torque difference is introduced between left and right drive wheels of a vehicle equipped with the left and right wheels drive system according to the first embodiment of the invention together with those of the comparison example.

FIG. 7 shows acceleration and deceleration limits with respect to a vehicle speed that would result when a maximum torque difference is introduced between left and right drive wheels of a vehicle equipped with the left and right wheels drive system according to the first embodiment together with those of the comparison example. The torque control ranges of the left and right wheels are restricted as is shown in FIG. 5. Thus, when a maximum torque difference is introduced between the left and right wheels, with the system of this embodiment, the total output torque can be made larger than that of the comparison example, and therefore, the acceleration and deceleration limits are also increased, from which it is seen that the acceleration performance of the vehicle can be increased.

Figure 8:
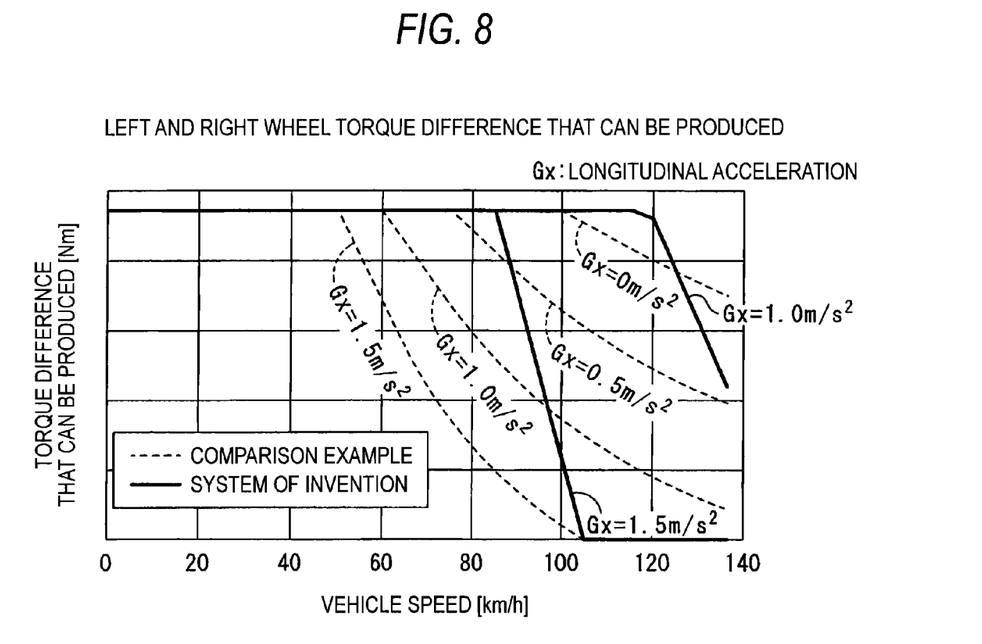
FIG. 8 is a chart showing torque differences that would occur between the left and right drive wheels with respect to vehicle speeds and accelerations and decelerations of the vehicle equipped with the left and right drive system according to the first embodiment of the invention together with those of the comparison example.

FIG. 8 shows torque differences that would occur between the left and right drive wheels with respect to vehicle speeds and accelerations and decelerations of the vehicle equipped with the left and right drive system according to the first embodiment together with those of the comparison example. A larger total drive torque of the vehicle needs to be ensured as the acceleration or deceleration speed increases and as the vehicle speed is increased. Thus, it follows that a torque difference that would occur between the left and right wheels is decreased accordingly. However, it is seen that with the system of this embodiment, the torque difference that would occur between the left and right wheels can be larger than that of the comparison example under every condition.

Here, upper limits of the gear ratios b1, b2 will be described here. In the case of the system of this embodiment, as the gear ratios b1, b2 are increased, the output torque difference between the motors can be multiplied further to constitute a torque difference between the left and right wheels WL, WR. However, when the bear ratios b1, b2 are increased excessively, one of the motors has to be rotated in the reverse direction due to a speed difference between the inner and outer wheels when the vehicle is turning. In order to control the output torque in a smooth fashion, when the control includes the reverse rotation of the motor, the detection of the motor speeds and the control of the motor electric current values based on the motor speed so detected have to be implemented with high accuracy to attain the smooth output torque control. To attain the object, the hardware configuration in relation to the motors will be extremely expensive.

Then, the gear ratios b1, b2 are preferably set so that the motor is not rotated in the reverse direction within the running range of the vehicle.

Second Embodiment (Configuration)

Figure 9:
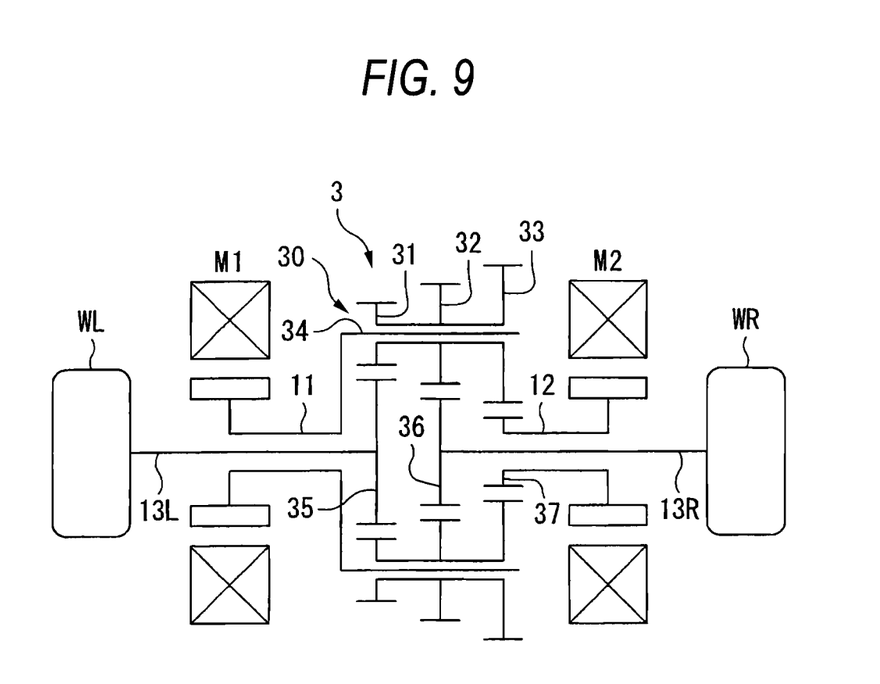
FIG. 9 is a skeleton diagram showing a gear mechanism depicting a left and right wheels drive system according to a second embodiment of the invention.

A left and right wheels drive system of a second embodiment includes, as is shown in FIG. 9, a first electric motor (a first motor) M1 as a first drive source, a second electric motor (a second motor) M2 as a second drive source, a gear mechanism 3, a left drive wheel (also, referred to simply as a left wheel) WL and a right drive wheel (also, referred to simply as a right wheel) WR and is equipped on an electric vehicle (including not only a pure electric vehicle but also a hybrid-type electric vehicle) as part (a power plant) of a drive line. Electric motors in the same specification in terms of maximum output are used for the first motor M1 and the second motor M2.

The gear mechanism 3 includes, as a pinion set, a triple pinion 30 in which a first pinion gear 31, a second pinion gear 32 of which a reference pitch diameter is larger than that of the first pinion gear 31, and a third pinion gear 33 of which a reference pitch diameter is larger than that of the second pinion gear 32. In addition to this triple pinion 30, the gear mechanism 3 includes four power transmission elements such as a carrier 34 which supports rotatably the triple pinion 30, a first sun gear 35 which meshes with the first pinion gear 31, a second sun gear 36 which meshes with the second pinion gear 32 and a third sun gear 37 which meshes with the third pinion gear 33.

Then, the first motor M1, the second motor M2, the left wheel WL and the right wheel WR are connected to the gear mechanism 3. The first motor M1 is connected to the carrier 34 via a hollow shaft 11, the second motor M2 to the third sun gear 37 via a hollow shaft 12, the left wheel WL to the first sun gear 35 via a shaft 13L, and the right wheel WR to the second sun gear 36 via a shaft 13R.

This configuration satisfies [Prescription 1] to [Prescription 3] described above, and the first motor M1, the second motor M2, the left wheel WL and the right wheel WR are put in a relationship shown in a speed diagram of FIG. 3C via the gear mechanism 3.

In the case of this embodiment, since the degree of freedom is high in setting reference pitch diameters of the first sun gear 35, the second sun gear 36, and the third sun gear 37, restrictions on gear rations b1, b2 of the motors M1, M2 from the gear mechanism 3 are limited. Therefore, upper limits of the gear ratios b1, b2 can easily be set to larger values than those of the first embodiment.

(Function and Advantage)

Since the left and right wheels drive system of this embodiment is configured as has been described heretofore, as with the first embodiment, the output torque difference between the motors is multiplied to constitute a torque difference between the left and right wheels WL, WR. Thus, the turning of the vehicle can be controlled by introducing a required torque difference between the left and right wheels WL, WR, while suppressing the reduction in total drive torque of the vehicle.

In this embodiment, the restrictions on the gear ratios bl, b2 from the gear mechanism 3 are limited, and therefore, the upper limits of the gear ratios b1, b2 can easily be set to larger values than those of the first embodiment. Thus, the output torque difference between the motors is multiplied further to constitute a torque difference between the left and right wheels WL, WR. Therefore, the turning of the vehicle can be controlled by introducing a required torque difference between the left and right wheels WL, WR, while suppressing further the reduction amount of drive torque outputted from one of the motors so as to ensure the drive output of the vehicle to increase the dynamic performance (such as acceleration performance, high-speed driving performance and traction performance) thereof.

Thus, while the embodiments of the invention have been described heretofore, the invention is not limited to the embodiments but can be altered variously without departing from the spirit and scope thereof.

For example, in the first embodiment, while the first motor M1, the second motor M2, the left wheel WL and the right wheel WR are connected to the gear mechanism 2 which employs the twin pinion 20 as the pinion set in the first embodiment and to the gear mechanism 3 which employs the triple pinion 30 as the pinion set in the specific forms which fall within the range satisfying [Prescription 1] to [Prescription 3] described above, as has been described in the section of Principle Configuration, the invention is not limited to the configurations described therein, and hence, there exist various configurations.

In addition, in the embodiments, while the drive sources are described as being the electric motors (the motors) and the left and right wheels drive system as being installed in the electric vehicle, the drive sources are not limited to the electric motors, and the system concerned can also be applied to vehicles other than the electric vehicle.

The gear ratios of the four-element, two-degree-of-freedom rotary mechanism may be set so that both the drive sources (for example, electric motors) are not reversed when the left and right drive wheels are normally driven (when the vehicle drives forwards).

According to an aspect of the invention, the drive sources and the left and right drive wheels are connected to the four elements of the gear mechanism which is configured as the four-element, two-degree-of-freedom rotary mechanism in the required arrangement. Therefore, when a difference between the drive torque outputted from the first drive source and the drive torque outputted from the second drive source is introduced, the difference of the drive torque is multiplied and then transmitted to the left and right drive wheels. When wanting to ensure a large total drive torque at the left and right wheels, the drive torque of one of the first motor and the second motor is increased to be the maximum value, while the drive torque of the other motor is reduced, so that a drive torque difference is introduced between the left and right wheels. As this occurs, a required drive torque difference can be introduced between the left and right drive wheels, while suppressing the reduction amount of drive torque outputted from one of the drive sources, whereby the turning of the vehicle can be controlled by introducing the required drive torque difference between the left and right drive wheels, while suppressing the reduction in total drive torque of the vehicle.

In the event that the twin pinion is adopted for the pinion set of the gear mechanism, the aforesaid advantage can be obtained with the simple configuration.

In the event that the triple pinion is adopted for the pinion set of the gear mechanism, the multiplication of drive torque difference can be set large, and the reduction in total drive torque of the vehicle that occurs when the required drive torque difference is introduced between the left and right drive wheels can be suppressed further.

In the event that drive sources in the same specification in terms of maximum output are employed for the first and second drive sources, the torque control is implemented simply. Moreover, employing such drive sources is also advantageous in terms of costs.

In addition, in the event that electric motors are employed for the first and second drive sources, the torque control can be implemented with high accuracy, whereby an appropriate drive torque difference can be introduced between the left and right drive wheels.

What is claimed is:

1. A left and right wheels drive system comprising:
a first drive source and a second drive source;
a left drive wheel and a right drive wheel; and
a gear mechanism interposed between the first and second drive sources and the left and right drive wheels, the gear mechanism including:
a pinion set in which a plurality of pinion gears are installed on one shaft; and
an element group which is linked with the pinion set and which includes a first element, a second element, a third element and a fourth element,
wherein
when the first element is held stationary, the second, third and fourth elements rotate in the same direction,
when the first element is held stationary, the second element rotates at a higher speed than the third and fourth elements,
one of the first and second drive sources is connected to the first element,
the other of the first and second drive source is connected to the second element,
one of the left and right drive wheels is connected to the third element, and
the other of the left and right drive wheels is connected to the fourth element,
wherein
the pinion set is a twin pinion including:
a first pinion gear; and
a second pinion gear of which a reference pitch diameter is larger than that of the first pinion gear,
the element group includes:
a first sun gear which is adapted to mesh with the first pinion gear;
a second sun gear which is adapted to mesh with the second pinion gear;
a carrier which pivotally supports the twin pinion; and
a ring gear which is adapted to mesh with one of the first and second pinion gears, and
the first element is the ring gear, the second element is the second sun gear, the third element is the carrier, and the fourth element is the first sun gear.

2. The left and right wheels drive system according to claim 1, wherein
a specification of the first drive source is identical to a specification of the second drive source, and maximum output of the first drive source is identical to maximum output of the second drive source.

3. The left and right wheels drive system according to claim 1, wherein
the first drive source is an electric motor, and the second drive source is an electric motor.

4. A left and right wheels drive system comprising:
a first drive source and a second drive source;
a left drive wheel and a right drive wheel; and
a gear mechanism interposed between the first and second drive sources and the left and right drive wheels, the gear mechanism including:
a pinion set in which a plurality of pinion gears are installed on one shaft; and
an element group which is linked with the pinion set and which includes a first element, a second element, a third element and a fourth element,
wherein
when the first element is held stationary, the second, third and fourth elements rotate in the same direction,
when the first element is held stationary, the second element rotates at a higher speed than the third and fourth elements,
one of the first and second drive sources is connected to the first element,
the other of the first and second drive source is connected to the second element, one of the left and right drive wheels is connected to the third element, and the other of the left and right drive wheels is connected to the fourth element, wherein the pinion set is a triple pinion including:
- a first pinion gear;
- a second pinion gear of which a reference pitch diameter is larger than that of the first pinion gear; and
- a third pinion gear of which a reference pitch diameter is larger than that of the second pinion gear, the element group includes:
- a first sun gear which is adapted to mesh with the first pinion gear;
- a second sun gear which is adapted to mesh with the second pinion gear;
- a third sun gear which is adapted to mesh with the third pinion gear; and
- a carrier which pivotally supports the triple pinion, and the first element is the carrier, the second element is the third sun gear, the third element is the first sun gear, and the fourth element is the second sun gear.

5. The left and right wheels drive system according to claim 4, wherein a specification of the first drive source is identical to a specification of the second drive source, and maximum output of the first drive source is identical to maximum output of the second drive source.

6. The left and right wheels drive system according to claim 4, wherein the first drive source is an electric motor, and the second drive source is an electric motor.

\* \* \* \* \*